Jan. 30, 1945.  L. B. HARRIS  2,368,298
AIRCRAFT STRUCTURE
Filed July 11, 1942  2 Sheets-Sheet 2

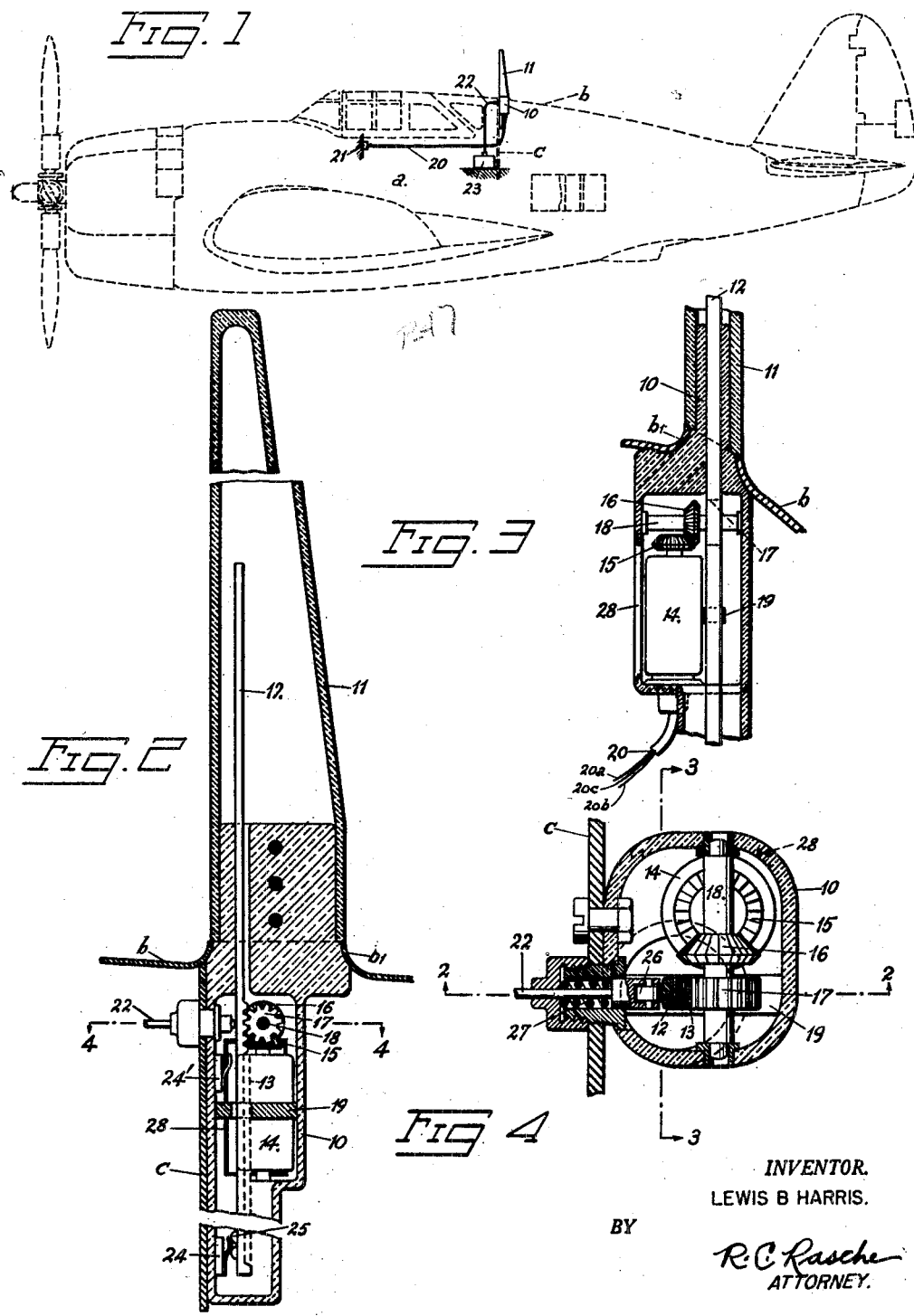

INVENTOR.
LEWIS B HARRIS.
BY
R. C. Rasche
ATTORNEY.

Patented Jan. 30, 1945

2,368,298

UNITED STATES PATENT OFFICE 2,368,298

AIRCRAFT STRUCTURE

Lewis B. Harris, Nassau Shores, N. Y., assignor to Republic Aviation Corporation, a corporation of Delaware Application July 11, 1942, Serial No. 450,555

7 Claims. (Cl. 250—33)

The present invention relates to radio receiving and transmitting installations for aircraft and more especially to ultra-high frequency radio installations.

The antennae of ultra-high frequency aircraft radio sets are required to operate over an unusually wide range of quite high frequencies (on the order of 224 megacycles) and for more satisfactory service, have to be of considerable sensitivity and selectivity. Meeting these conditions hence would require continual adjustments of the length of such antennae, yet, for structural and aerodynamic considerations, these antennae have to be of the "mast" type.

Heretofore, "mast" type antennae have all been of a predetermined fixed length, unchangeable during the operation of the set and operating only when the full length of the "mast" was used, resulting in the variance of the inductance, selectivity and sensitivity having to be taken care of in the receiver or transmitter itself, if such factors were taken care of at all.

It is the general object of this invention to provide a radio antenna for aircraft which, though of the "mast" type, can nonetheless be continually adjusted during flight to enable "mast" type antennae to function for ultra-high frequencies and to take care of widely varying conditions of inductance, selectivity and sensitivity also.

Specifically, it is an object of the invention to provide a "mast" type antenna which will be operable for ultra-high frequencies, not only when extended and used at its fullest extension, with considerable selectivity and sensitivity and satisfactory inductance, but which can also, even during flight, be retracted into or extended out of the screen provided by some one or the other of the metallic components of an all-metal aircraft, so that the mast will operate not only when protruding at its full length, but at all desired intermediate positions, even when retracted almost into the metallic component of the aircraft.

More particularly, it is an object of the invention to provide, especially for single-place highspeed aircraft, power-means and a control system therefor, which, when selectively actuated by the single occupant of the aircraft, will automatically extend or retract a remotely located mast the desired amount, means being provided for automatically acting to restrain the mast positively in any desired position of retraction or protraction, means also being provided for automatically shutting off the power-applying means when the moving mast approaches uppermost and lowermost extreme limits, so that the already preoccupied pilot will have to give but the minimum attention to his radio set.

The other objects, advantages and results of the invention will be made manifest as this disclosure proceeds.

One embodiment of the inventive concepts is shown in the accompanying drawings, but it is to be understood that these drawings and the embodiment shown therein and described hereinafter, are provided by way of exemplification only, the inventive concepts being limited in their embodiments and modifications only by the scope of the subjoined claims.

In these drawings,

Figure 1 is a side elevational view, showing the apparatus of the present invention, in solid lines, installed in a single-place, high-speed airplane, shown in broken lines;

Figure 2 is a vertical, substantially central section of a component thereof taken along line 2—2 of Figure 4.

Figure 3 is a fragmentary vertical section taken athwartship of the airplane, substantially along the line 3—3 of Figure 4;

Figure 4 is a horizontal section taken on line 4—4 of Figure 2.

Figure 5:
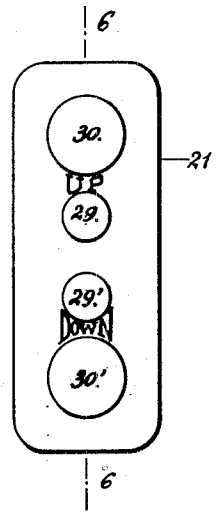
Figure 5 is a front elevational view showing the control member of the installation.

The radio installation shown in the drawings comprises a combined transmitter and receiver 23, mounted in the fuselage $a$ of a single-place, high-speed airplane, here shown as of the "Republic" type, immediately behind the pilot's seat, on or adjacent to a bulkhead or former $c$, and connected electrically in circuit with an antenna system by means of a suitable electrical conductor, 22, and a control switch 21—the purpose of which will be made manifest—suitably connected by electrical conductors 20, to an antenna system.

The antenna system comprises three major constructional components, a base 10, a member 11 and a reciprocatable rod 12. The base consists of a hollow, plastic-material body of an oval shape in its middle portion, streamlined in its upper, and cylindrical in its lower portion. It is rigidly attached to the bulkhead $c$ of the fuselage and supports the lower end of the member 11, which is attached thereto.

Inside the oval portion, there is suitably vertically mounted a two-phase electric motor 14, which is reversible in direction of rotation, and is supplied with electrical energy from the regular normal electrical installation of the airplane. Its operation is controllable by means of the switch 21, which is mounted on or very near the pilot's instrument panel, the switch being connected in circuit with the motor by means of the three-wire system 20. The motor has a shaft on which is mounted a bevel-gear 15. Above the motor is mounted a lay-shaft 18 which carries a corresponding and meshing bevel-gear 16, for driving the shaft 18. The shaft also carries a spur gear 17.

A horizontal bridge 19 is provided with an aperture through which the rod 12 is adapted to pass. The rod 12 is, in this embodiment, made of a metallic material, the cross-section of which is that of a rectangle with rounded corners, the material, contour and length of the rod being such as to adapt it to function as a very high frequency antenna for both the reception and transmission of ultra-high frequency radio waves. The rod 12 has its lower portion provided with teeth 13 of such a number and profile as to mesh with the corresponding teeth on the spur gear 17. The upper portion of the rod, passing through the block portion of the base 10, bears thereagainst and is thereby guided, in conjunction with the bridge 19.

The member 11, in this embodiment, comprises a hollow body of plastic-material tapered from bottom to top and perfectly streamlined in cross section and it is attached to the base 10 in any suitable manner. The member 11, being of plastic-material and completely enclosing whatever portion of rod 12 that extends outside the metal screen of the airplane, serves not only to protect rod 12 from air stream vibrations which would affect the electrical properties of the rod, but also serves to shield the rod from the adverse influences of static discharges or all other such influences and as well, protects the rod from the adverse influences of ice formation, rain coating, and all other adverse weather influences. However, if desired, member 11 may be omitted and the rod 12 itself be streamlined and coated with a suitable protective material.

The rod 12 bears two contact knobs 25 at its lower end and the inside face of member 10 bears two automatic micro-switches or circuit breakers 24 and 24' adapted to be controlled by said knobs. When the motor, controlled by the switch 21, is set in operation and actuates the mechanism for moving the rod 12 to its lowermost, retracted position, contact knobs 25 actuate the micro-switch 24, which is electrically connected in the motor supply line 20b, to open the down circuit and thereby stop the motor; when the motor, on the other hand, has driven the rod 12 automatically into its uppermost position, the contact knobs 25 actuate the micro-switch 24' properly connected in the supply line 20a of the motor, to open then the up circuit and again stop the motor. Thus, rod 12 is automatically prevented from overrunning certain fixed limits of extension or retraction. The switch 21 in the cockpit is actuatable by the pilot to start the motor in one direction by pressing one button, the "up" button 29 of the switch say, whereupon the antenna is moved upward until the pilot removes pressure on said button 29 in the switch 21 to stop the antenna at any intermediate position. If the pilot does not remove his finger from the button 29, the rod 12 moves upwardly until the knobs 25 meet switch 24', whereupon upward movement is automatically stopped. By pressing the down button 29 in the switch, the antenna is moved downwardly until the pilot removes his finger from said button to stop it in an intermediate position, but if the pilot wishes full retraction, he merely presses the down button 29' and maintains pressure until the antenna is automatically stopped at its lowermost limit (shown in dotted lines on Figure 7) by the opening of the line 20b through the knob 24.

Constant contact for electrical circuit between the antenna and the receiver-transmitter 23, is maintained by means of a group 26, 27 and 22, and comprising a spring-urged plunger carrying a roller 26, which is constantly maintained in contact with rod 12, the plunger being connected electrically to the member 23 by means of a conductor 22, the member 27 consisting of a coiled helical spring, mounted in a bushing having a cap, as shown.

Figure 6:
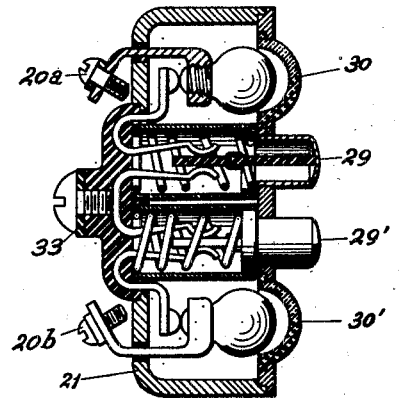
Figure 6 is a vertical section taken along line 6—6 of Figure 5.

A door 28 is provided in the side wall of base 10, for servicing the motor 14. The control switch 21, in addition to the two spring-pressed buttons 29, 29', contains two lights 30, 30' to indicate to the pilot when the antenna reaches either of its extreme positions. (See Figures 5 and 6).

Figure 7:
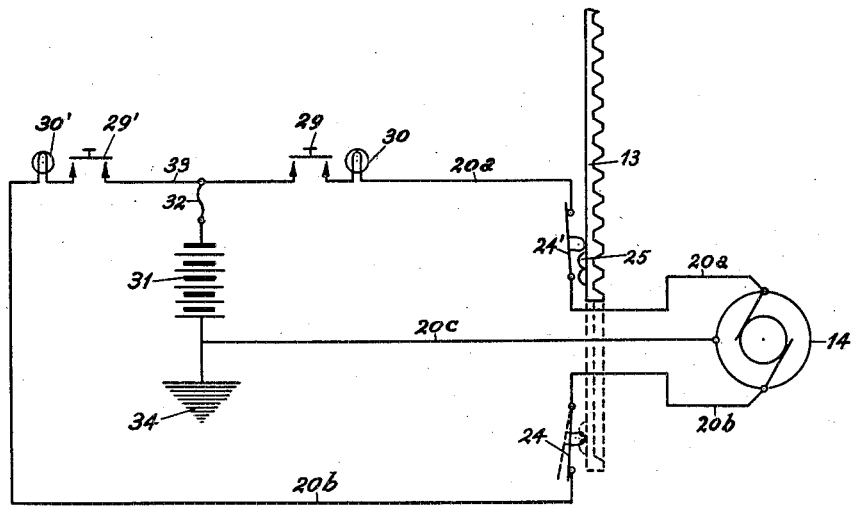
Figure 7 is a diagram showing the electrical installation of this embodiment.

Figure 7 shows diagrammatically the three electrical connections 20a, 20b and 20c forming the line 20 between a ground 34, the control switch 21 and the electric motor 14. The electric current is supplied to the two circuits of the motor by a battery 31 through a fuse 32 and a common supply conductor 33.

The micro-switches 24, 24' are normally closed, while the individual switches 29, 29' of the control box 21 are normally open.

When the antenna is set in one of its extreme positions, say the lowermost (shown in dotted line Figure 7), the lamp 30' does not light when the pilot actuates by mistake the down button 29' as the down circuit of the motor remains open at 24.

In certain cases it is desirable that the base 10 be shielded with a screen grounded to the fuselage. In that case, the motor 14 is also electrically shielded in a grounded case.

Having thus disclosed the invention, what is claimed as new and is secured by U. S. Letters Patent, is:

1. An antenna system for aircraft, comprising a rod mounted for movement inwardly and outwardly of the aircraft, a hollow fixed-length member mounted on the outside of the aircraft contiguous to the rod for streamlining and protecting same and into which varying lengths of said rod may be projected, a motor mounted contiguous to the rod, electrical connections between the aircraft's source of electricity and the motor, power-transmission connections between said rod and said motor, and an electrical control system in said electrical connections for energizing the motor selectively thereby determining the degree of projection or retraction of said rod.

2. An antenna system for aircraft, comprising a rod mounted for reciprocation relatively to the aircraft, a fixed-length streamlined housing mounted contiguous to the upper end of the rod, a reversible motor mounted contiguous to the lower end of the rod and in electrical circuit with the electrical source in the aircraft, power-transmitting connections between the motor and the rod, circuit-controlling means terminating adjacent the pilot for causing the motor to run in either direction to raise or lower the rod within and longitudinally of said housing, and means for automatically breaking the circuit when the rod approaches extreme limits of travel.

3. In an antenna system according to claim 1, an electrical conductor, a plunger on one end thereof contiguous to said rod, a roller on the end thereof nearest the rod, and, an abutment and a coiled spring mounted between the plunger and the abutment for continuously pressing the roller against the rod.

4. In an antenna system according to claim 1, switches in the electric circuits of said control system, and electric lamps in circuit with said switches adapted to be lighted to indicate extreme positions of said rod.

5. In combination, an all metal aircraft fuselage, a rigid antenna rod mounted for reciprocation inwardly and outwardly of said fuselage, a hollow-fixed housing positioned exteriorly of the fuselage in alignment with the path of movement of said rod and into and from which it may be protracted and retracted, and means under the control of the pilot to regulate and determine the protracted or retracted positions of the rod with respect to said housing and the fuselage.

6. The combination with an aircraft fuselage, of a base of insulating material mounted in the fuselage wall having a passage extending through it, a hollow housing of insulating material mounted on said base exteriorly of the fuselage and aligned with the passage therein, an antenna rod mounted for reciprocation in the passage of the base to be projected into the housing and retracted therefrom, a rack on the inner end of said rod, a reversible motor in the base, a gear chain operatively connecting the motor and the rack, an electric system for the operation of the motor in either direction, and a constant sliding electric contact with said rod for maintaining connection between it and a receiver-transmitter.

7. The combination with a metal aircraft fuselage, of a base member of insulating material mounted in the fuselage having a passage extending through it, a hollow housing of insulating material mounted on said base exteriorly of the fuselage and aligned with the passage therein, an antenna rod mounted for reciprocation in the passage of the base member to be projected into the housing and retracted therefrom; a rack on the inner end of said rod, a reversible electric motor housed in the base member, a gear chain operatively connecting the shaft of said motor with the rack aforesaid, an electric control system for regulating the operation of the motor in either direction from a remote control point, a receiver-transmitter, and a sliding electric contact between said rod and said receiver-transmitter for maintaining constant electrical connections.

LEWIS B. HARRIS.